(12) United States Patent
Arana et al.

(10) Patent No.: US 10,674,111 B2
(45) Date of Patent: Jun. 2, 2020

(54) SYSTEMS AND METHODS FOR PROFILE BASED MEDIA SEGMENT RENDERING

(71) Applicant: Disney Enterprises, Inc., Burbank, CA (US)

(72) Inventors: Mark Arana, Burbank, CA (US); Jared McPhillen, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/838,318

(22) Filed: Dec. 11, 2017

(65) Prior Publication Data
US 2019/0182451 A1 Jun. 13, 2019

(51) Int. Cl.
| | |
|---|---|
| *H04N 7/12* | (2006.01) |
| *H04N 11/02* | (2006.01) |
| *H04N 11/04* | (2006.01) |
| *H04N 7/01* | (2006.01) |
| *G06K 9/00* | (2006.01) |
| *G11B 27/00* | (2006.01) |
| *H04N 19/00* | (2014.01) |

(52) U.S. Cl.
CPC .......... *H04N 7/01* (2013.01); *G06K 9/00684* (2013.01); *G06K 9/00711* (2013.01); *G11B 27/00* (2013.01); *H04N 19/00* (2013.01); *G06K 2209/27* (2013.01)

(58) Field of Classification Search
CPC . H04N 7/01; H04N 7/12; H04N 11/04; H04N 11/02; H04N 19/87; H04N 19/00921; H04N 19/00472; H04N 19/00587; G06K 9/00684

USPC .............. 375/240.02, 240.12, 240.16, 240.2; 348/441; 725/5
See application file for complete search history.

(56) References Cited

U.S. PATENT DOCUMENTS

| | | | |
|---|---|---|---|
| 7,068,722 B2* | 6/2006 | Wells | H04N 5/21 341/51 |
| 9,071,842 B2* | 6/2015 | Li | H04N 19/115 |
| 9,118,965 B1* | 8/2015 | Gravino | H04N 21/4622 |
| 9,467,718 B1* | 10/2016 | Newell | G06Q 50/01 |
| 9,813,706 B1* | 11/2017 | Lin | H04N 19/00921 |
| 2009/0041422 A1* | 2/2009 | Staker | H04N 5/272 386/353 |
| 2011/0313550 A1* | 12/2011 | Altshuler | A63F 13/12 700/91 |

(Continued)

OTHER PUBLICATIONS

U.S. Appl. No. 15/838,307, filed Dec. 11, 2017, Disney Enterprises, Inc.

*Primary Examiner* — Trang U Tran
(74) *Attorney, Agent, or Firm* — Farjami & Farjami LLP

(57) ABSTRACT

Systems and methods are provided for transcoding media content in accordance with thematic and/or cinematic characteristics of scenes. In particular, compression techniques may be selected to optimize compression of scenes based on their thematic and/cinematic characteristics. Scene boundary identifiers, such as scene in and out points may be identified, and the corresponding thematic and/or cinematic characteristic meta-data can be sent to a transcoder for transcoding. In this way, the specific characteristics of each scene in a movie can be accounted for during transcoding. This can result in transcoded versions of the movie that have better audio/visual qualities, and that can be encoded at a lower overall bit rate.

20 Claims, 5 Drawing Sheets

(56) References Cited

U.S. PATENT DOCUMENTS

2013/0166580 A1\* 6/2013 Maharajh .............. H04L 65/605
707/758

\* cited by examiner

SYSTEMS AND METHODS FOR PROFILE BASED MEDIA SEGMENT RENDERING

TECHNICAL FIELD

The present disclosure relates generally to digital media encoding, and more particularly, some embodiments relate to systems and methods for optimizing compression techniques based on a type of scene being transcoded.

DESCRIPTION OF THE RELATED ART

Due to the growing number of digital media distribution platforms that are available, a single piece of media content, such as a movie, is often digitized or transcoded into different formats and/or bit-rates. Many content distributors create multiple versions of a single video, song, or other digital media program for multiple avenues of distribution. For example, for a single piece of content, a video distributor might maintain a plurality of different files having the same resolution but different bitrates. These groups of files may be used in web distribution using adaptive variable bitrate streaming techniques.

Transcoding can be controlled with settings that specify or configure the manner in which compression is performed to achieve a desired output file, which may be used, for example, in adaptive variable bitrate streaming distribution. The settings are often selected based on the type of media content being transcoded, for example, whether the media content is 3D animated media content, hand drawn animated media content, media content characterized by film grain, etc. In other words, the settings are selected based on a characterization of an entire instance of media content, e.g., an entire movie.

BRIEF SUMMARY OF THE DISCLOSURE

In accordance with one embodiment, a computer-implemented method, comprises identifying and categorizing scenes of a media content, and assigning a compression profile to each of the scenes, wherein the compression profile is selected based upon one or more characteristics of at least one of the scenes. The computer-implemented method further comprises transcoding the media content from a first format to at least one other format in accordance with the compression profile, and generating an output file from the transcoded media content in the at least one other format.

In some embodiments, the identification and categorization of the scenes of the media content is performed automatically based upon one or more common elements between frames or a group of pictures comprising a scene. In some embodiments, the one or more characteristics of the at least one of the scenes comprises at least one of thematic and cinematic characteristics.

In some embodiments, the transcoding comprises multi-pass transcoding, wherein a first pass of the multi-pass transcoding comprises generating a statistics file including information regarding compression settings comprising the compression profile assigned to each of the scenes. The statistics file further includes scene boundary information. The computer-implemented method may further comprise defining scene boundaries for identifying the scenes upon performing the transcoding. In some embodiments, defining the scene boundaries comprises specifying scene in and out points.

In some embodiments, the media content is presented as at least one of a live stream and a live broadcast.

The computer-implemented method further comprises analyzing metadata associated with the at least one of the live stream and the live broadcast to identify at least one of start and end points associated with a commercial presented during the at least one of the live stream and the live broadcast.

In some embodiments, the computer-implemented method further comprises analyzing metadata associated with the at least one of the live stream and the live broadcast to identify at least one of start and end points associated with media content presented as the at least one of the live stream and the live broadcast.

In some embodiments, transcoding the media content comprises transcoding a source file representing the media content.

In accordance with another embodiment, a computer-implemented method comprises receiving scene start and end points associated with each of a plurality of scenes comprising a movie. The computer-implemented method further comprises receiving one or more sets of compression settings applicable to each of the plurality of scenes. Each of the one or more sets of compression settings may have been selected based upon at least one of thematic and cinematic characteristics of each of the plurality of scenes. Each of the plurality of scenes are transcoded in accordance with a corresponding set of compression settings. Transcoded versions of each of the plurality of scenes can be output.

In some embodiments, the transcoding of each of the plurality of scenes comprises performing an analysis pass and an encoding pass. In some embodiments, the encoding pass comprises compressing each of the plurality of scenes in accordance with the corresponding set of compression settings. The transcoding of each of the plurality of scenes comprises assigning the transcoding of each of the plurality of scenes to separate transcode nodes, and performing the transcoding of each of the plurality of scenes at the separate transcode nodes in parallel.

In some embodiments, the computer-implemented method further comprises storing the one or more sets of compressions settings as part of at least one of each of the transcoded versions of each of the plurality of scenes, in a transcoded version of the movie comprising each of the transcoded versions of each of the plurality of scenes stitched together, a data file associated with the transcoded version of the movie, and a statistics file used in the transcoding of each of the plurality of scenes.

In accordance with another embodiment, a system comprises a controller adapted to: obtain sets of groups of pictures each set of the groups of pictures representing one of a plurality of scenes of a media content; and assign one or more compression profiles including one or more compression techniques to each of the plurality of scenes, each of the one or more compression techniques having been selected based upon at least one of thematic and cinematic characteristics of each of the plurality of scenes. The system may further comprise at least one transcoder adapted to: transcode each of the plurality of scenes using a corresponding compression profile; and output a transcoded version of the media content comprising the plurality of transcoded scenes.

In some embodiments, the system further comprises a storage unit adapted to receive a statistics file generated by the at least one transcoder and including information indicative of at least the one or more compression techniques applicable to each of the plurality of scenes. The sets of groups of pictures are identified by start and end points. In some embodiments, the at least one transcoder operates prior to distribution of the transcoded version of the media content or in near-real time when receiving live media content.

In accordance with another embodiment a computer-implemented method comprises identifying and categorizing scenes of media content. A compression profile is assigned to each of the scenes, wherein the compression profile is selected based upon one or more characteristics of at least one of the scenes. A first scene of at least one of the scenes comprises live stream or live broadcast media content. The first scene is transcoded from a first format to at least one other format in accordance with the compression profile, the compression profile specifying a single-pass, constant bit rate compression scheme. Additionally, an output file is generated from the transcoded media content in the at least one other format.

In some embodiments, the first scene comprises a live stream action or live broadcast action scene.

In some embodiments, a second scene of the at least one of the scenes comprises a commentary portion of the live stream or the live broadcast media content. The computer-implemented method further comprises transcoding the second scene in accordance with a second compression profile specifying a single-pass, constant bit rate compression scheme with a lower bit rate than the single-pass, constant bit rate compression scheme used to transcode the first scene.

In some embodiments, a third scene of the at least one of the scenes comprises a pre-produced commercial. The computer-implemented method further comprises transcoding the third scene in accordance with a third compression profile specifying a single-pass, constant bit rate compression scheme with a lower bit rate than the single-pass, constant bit rate compression scheme used to transcode the second scene.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Because technique(s) selected for compressing media content (set forth in compression settings) during transcoding are based on media content type, i.e., a characterization of media content in its entirety, the audio/visual differences between scenes are not accounted for. That is, conventional systems and methods of transcoding confine the applicability of compression settings to high level characterizations, such as media content genre (live-action, hand-drawn animation, 3D animation, etc.). For example, the same compression settings might be applied when transcoding a movie comprising a first scene that involves an explosion, and a second scene that involves non-changing landscape scenery despite the audio/visual differences between the first and second scenes.

Accordingly, various embodiments are directed to the use of scene-based compression settings during the transcoding of media content. Output files resulting from transcoding in accordance with various embodiments can have different audio/visual qualities, may be compressed at lower bit rates, etc. Although various embodiments described herein refer to movies, other media content is contemplated, such as audio content, gaming content, etc.

Figure 1:
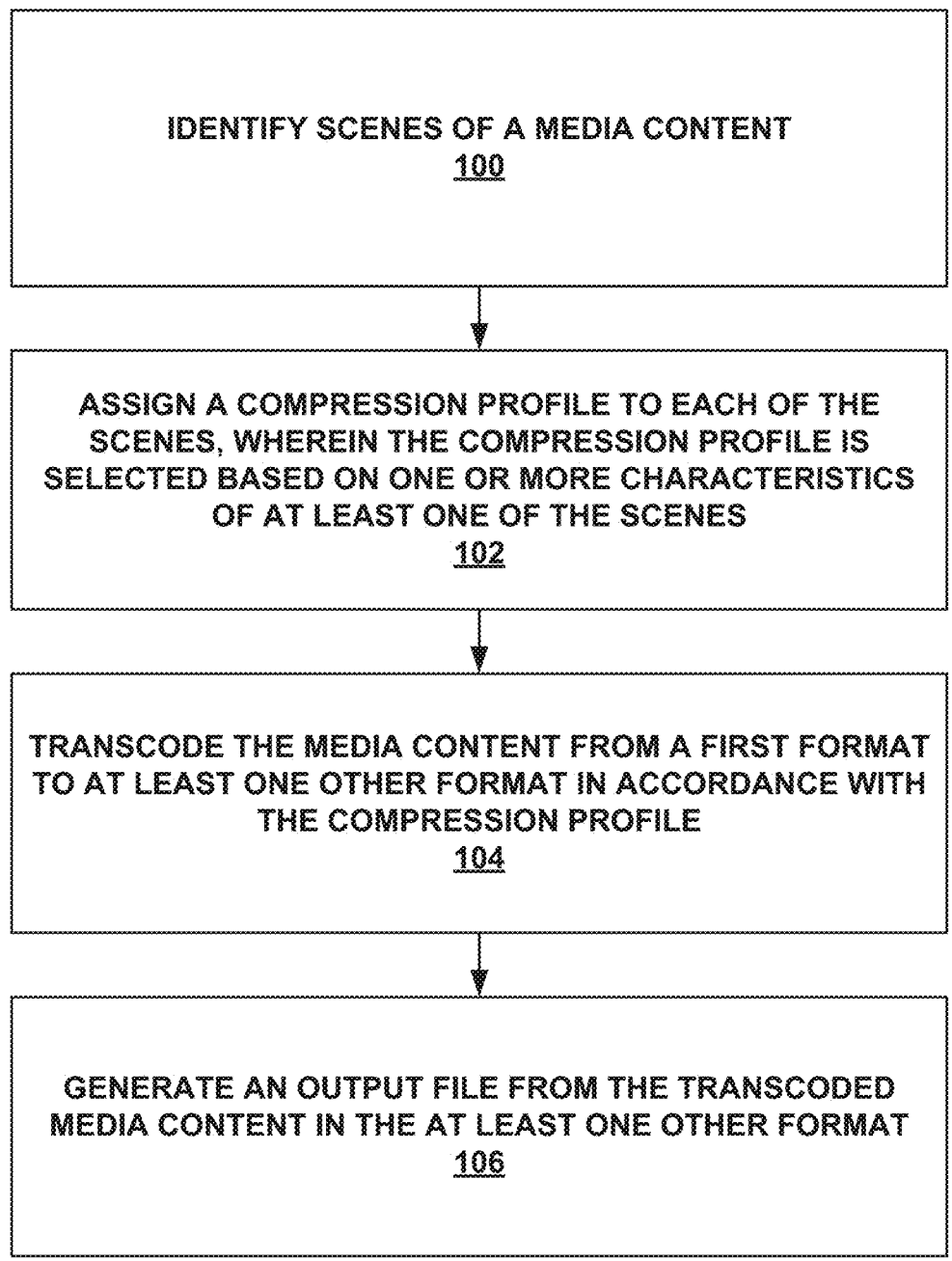
FIG. 1 is an operational flow diagram illustrating an example process for scene-based transcoding in accordance with various embodiments.

FIG. 1 is a flow chart illustrating example operations that may be performed to customize for and apply compression settings to scenes of a media content. FIG. 1 will be described in conjunction with FIG. 2, a schematic representation of an example transcoding system in accordance with various embodiments.

At operation 100, scenes of a media content are identified and categorized. In some embodiments, the media content is stored as a source file. A source file, as would be understood by those skilled in the art, may be a high-resolution media content file, such as a lightly compressed master file used to make additional compressed versions of the media content. One example of a source file is a mezzanine file encoded using, for example, the JPEG2000 codec. In some embodiments, the identification of scenes within the media content can be performed by a user determining scene in/out or start/end points representative of scene "boundary frames." That is, a user may analyze the media content by viewing/previewing the source file using a media viewer, editor, etc. on a computer 204, and determine groups of frames that make up a scene in the thematic and/or cinematic sense.

The scene in/out points may be timecodes or other data associated with particular frames that the user has deemed as delineating a scene. The scene in/out points may be stored as metadata with the source file or sent as a separate file/data. For example, a source file 204A may be appended with scene in/out metadata and sent to a transcoder 202, which may be embodied in a media server 206. Alternatively, a separate data file comprising the scene in/out points can be sent to transcoder 202. It should be noted that in some embodiments, transcoder 202 need not be implemented in a separate media server, but may be implemented on computer 204. Although a single transcoder 202 is illustrated, it should be understood that some transcoding systems may utilize multiple transcoders and/or multiple media servers or computers running transcoders, such that the transcoding process can be performed in parallel across different portions of a media content.

In some embodiments, a source file can be obtained from a remote datastore 208, such as a content database operated by a content provider, content developer, and the like. In this case, a source file 208A may be obtained from remote datastore 208 and sent to transcoder 202 that may be implemented in media server 206. As with the previous example, scene in/out points may be appended as metadata to source file 208A, or they may be transmitted separately to media server 206 for use by transcoder 202. The scene in/out points may have been previously determined and stored at remote datastore 208. For example, a user at computer 204 may have previewed media content represented in source file 208A and determined the scene in/out points, which were transferred to and stored at remote datastore 208 for later use. It should be noted that the manner in which scenes are identified and delineated can vary. The size of scenes, e.g., how many frames make up a scene can also vary.

It should be noted that in some embodiments, the identification and categorization of scenes can be automated. That is, characteristics of a certain set of frames or group of pictures, (described below) can be analyzed for similarities suggesting the frames/pictures are part of the same thematic or cinematic scene. Characteristics may include, but are not limited to, e.g., similar motion vectors signifying similar thematic/cinematic content, the presence of the same object(s) between frames, similar audio/hue/luminance/metadata descriptions, scene changes, significant bitrate increases, etc. An example system and methods of automated scene detection is described in co-pending U.S. patent application Ser. No. 15/838,307, which is incorporated herein by reference in its entirety. It should also be noted that categorization and/or identification can be performed manually beforehand, e.g., during the color grading process. In some embodiments, automatic categorization and/or identification can be overridden by a manual adjustment.

At operation 102, a compression profile is assigned to each of the scenes wherein the compression profile is selected based on one or more characteristics of at least one of the scenes. For each identified scene, a user may specify certain compression settings based on the scene's referenced characteristics. Some settings, referred to herein as presets, can comprise desired bit rates and resolution/size of resulting transcoded media content, or more advanced settings. In accordance with various embodiments, still other settings can be specified that are targeted/relevant to the aforementioned thematic/cinematic characteristics of individual scenes or similar sets of scenes. For example, such compression settings may include maximum group of picture (GOP) length, applicable codec, key frame frequency, Psy-RD settings, quantization delineations, frame size, etc. The preceding is an example list only, and is not meant to be limiting in any way. Those of ordinary skill in the art would be aware of various compression settings that may be specified.

In this way, the "optimal" compression technique may be used for a scene depending on its characteristics. It should be understood that a lossy encoding process sacrifices information to compress data. Many digital media encoding techniques follow a common chain of steps: (1) prediction; (2) transformation and quantization; and (3) entropy coding. The output produced by many such techniques are in the form of a sequence of GOPs. A GOP comprises a key frame, or intra-frame (I-frame), followed by various inter-frames, such as P-frames, B-frames, or b-frames.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Once the compression settings are selected, they can be used to generate a compression profile that may be applied to a scene or set of scenes during transcoding. Like the scene in/out points, one or more compression profiles applicable to a media content can be transmitted with the media content, e.g., as metadata, or otherwise appended to the source file, e.g., source file 204A or 208A. Alternatively, the one or more compression profiles can be sent separately from the source file to a transcoder, e.g., transcoder 202. It should be understood that compression profiles can be used for more than one scene if the user so desires. It should be understood that compression profiles can be stored in a datastore, e.g., remote datastore 208, that can be accessed by various users. In some embodiments, characteristics of a scene may be used to identify a scene type that can be correlated with a particular compression profile, and accessed for use in transcoding.

For example, a movie may be a predominantly live action movie having a first scene or set of scenes that was filmed in live action, while a second scene or set of scenes is animated or contains animated elements. Many movies being produced in the action/super hero genre are examples of movies that have both live action scenes and animated (e.g., computer-generated-image (CGI) animation) scenes. In accordance with conventional systems and methods of transcoding, a single set of compression settings would be used in the transcoding of the movie based, for example, on the movie being deemed a predominantly live action movie. However, the compression settings for a live action movie would not be optimal for the second scene or set of scenes that are animated or have animated elements. For example, a user may wish to apply a particular range of compression and a certain GOP length for transcoding animated scene(s) that are different from those that the user wishes to apply to live action scenes. For example, the user may wish to accommodate the harder lines and brighter colors of the animated scenes, while accommodating the more organic lines and more muted colors of the live action scenes. It should be understood that the compression settings specified for a scene(s) can be used to accommodate/optimize a variety of different media content characteristics, not all of which are described in the present disclosure, but would be known to those having skill in the art.

At operation 104, the media content is transcoded from a first format to at least one other format in accordance with the compression profile. For example, a source file, such as a mezzanine file, may be encoded using an H.264 codec. The transcoding operation contemplated in operation 104 may convert the source file from the Jpeg2000 format to, e.g., an H.264 format. Based on the scene, transcoding will be performed in accordance with compression settings set forth in a compression profile applied to a particular set of frames that make up an identified/categorized scene.

At operation 106, an output file is generated from the transcoded media content in the at least one other format. For example, referring to FIG. 2, transcoder 202 may generate an output file 204B that can be transmitted back to computer 204. In other embodiments, the output file, e.g., output file 208B may be transmitted back to remote datastore 208. Remote datastore 208 may be a datastore maintained by a content provider, content creator, and/or other entity from which different versions of a media content can be stored and retrieved (e.g., downloaded, streamed, etc.). In still other embodiments, an output file, such as output file 212 may be transmitted to a client device to be presented, e.g., a monitor 210, or a set-top box connected to monitor 210, etc.

Figure 2:
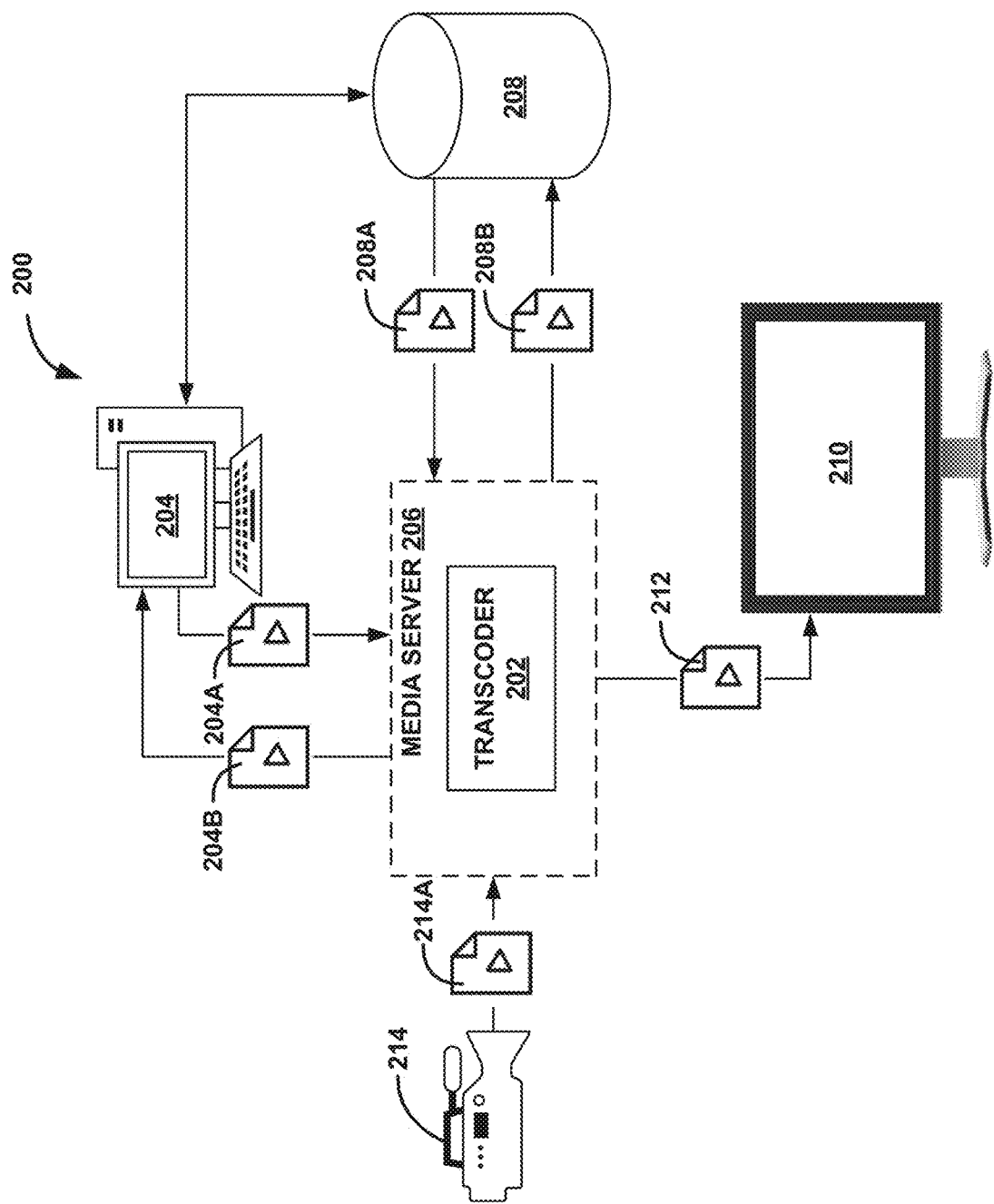
FIG. 2 illustrates an example transcoding system in accordance with one embodiment.
Figure 3A:
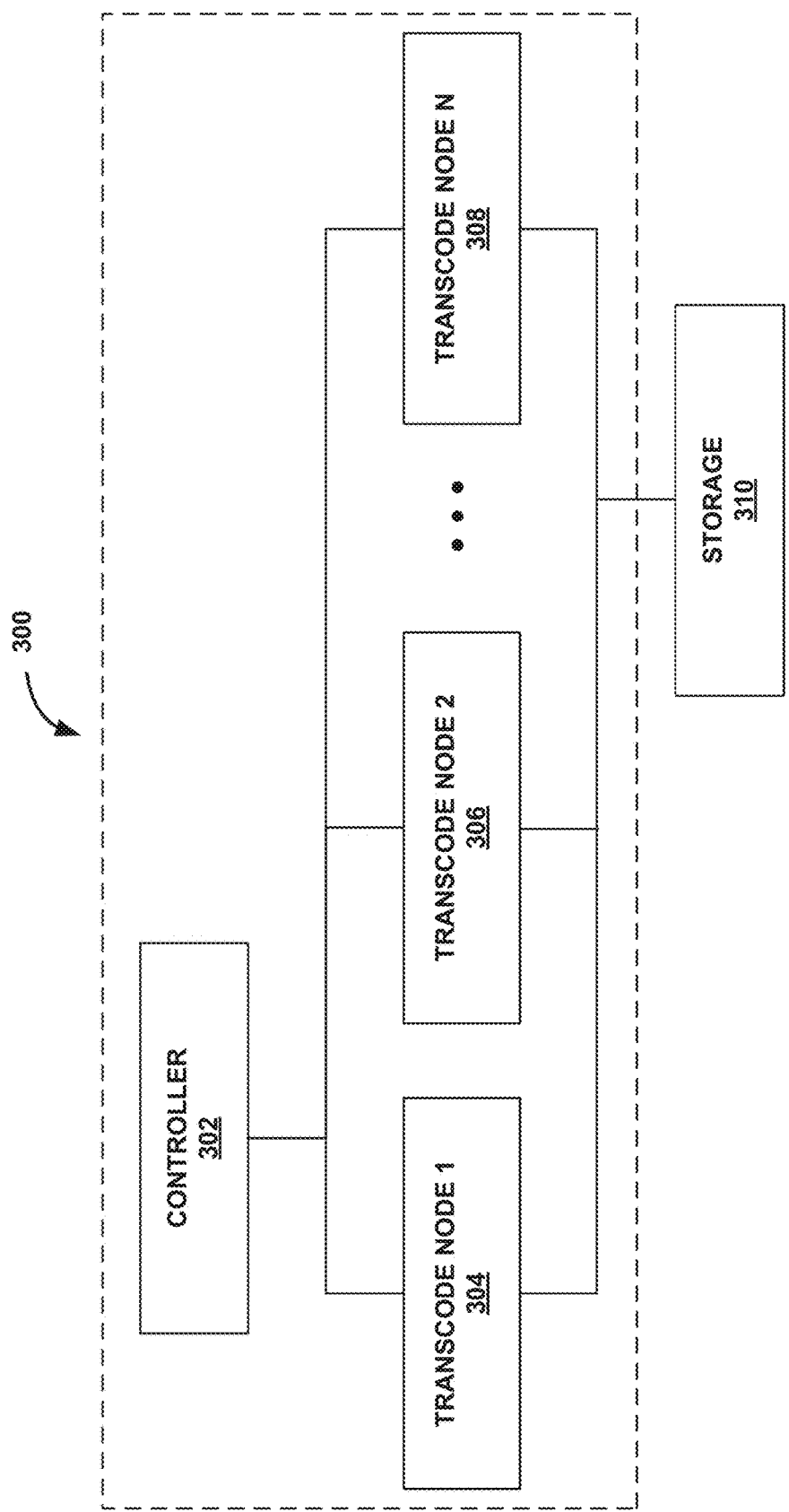
FIG. 3A illustrates example aspects of a transcoding system in accordance with one embodiment.

FIG. 3A illustrates example details of a transcoder 300 in accordance with various embodiments, and will be described in conjunction with FIG. 3B, a flow chart illustrating example operations that may be performed to transcode media content in accordance with another embodiment. Transcoder 300 may be an embodiment of the transcoder 202 illustrated in FIG. 2.

As illustrated in FIG. 3A, system 300 comprises a controller 302 in communication with a plurality of transcode nodes 304, 306, 308, and a network storage 310. The controller 302 maintains records and manages the transcoding processes performed by the transcode nodes 304, 306, 308. In some implementations, the controller 302 maintains records of where source files are stored on network storage 310 and records of where transcoded files should be stored on network storage 310. Network storage 310 may be one embodiment of remote datastore 208 (FIG. 2). The controller 302 may comprise a server or other network attached computer, which may be one embodiment of media server 206 or computer 204.

In one embodiment, transcode nodes 304, 306, 308 may be a plurality of network-attached computers in communication with the controller 302. In another embodiment, transcode nodes 304, 306, 308 may be parallel instances of a transcoder/transcoder application executed on the same or different processors. Each transcoding node 304, 306, or 308 can receive transcoding instructions from the controller 302, which can include scene in/out point data and scene-based compression profiles. In accordance with the instructions, the transcode nodes 304, 306, 308 retrieve a copy of the source file from the network storage 310 and transcode the source file to produce an output file.

The network storage 310 may comprise a storage area network, a network attached storage, a server system, or other network storage system. The storage 310 may store one or more of a source file, an output file, an associated statistics files, scene in/out data, and one or more compression profiles.

Figure 3B:
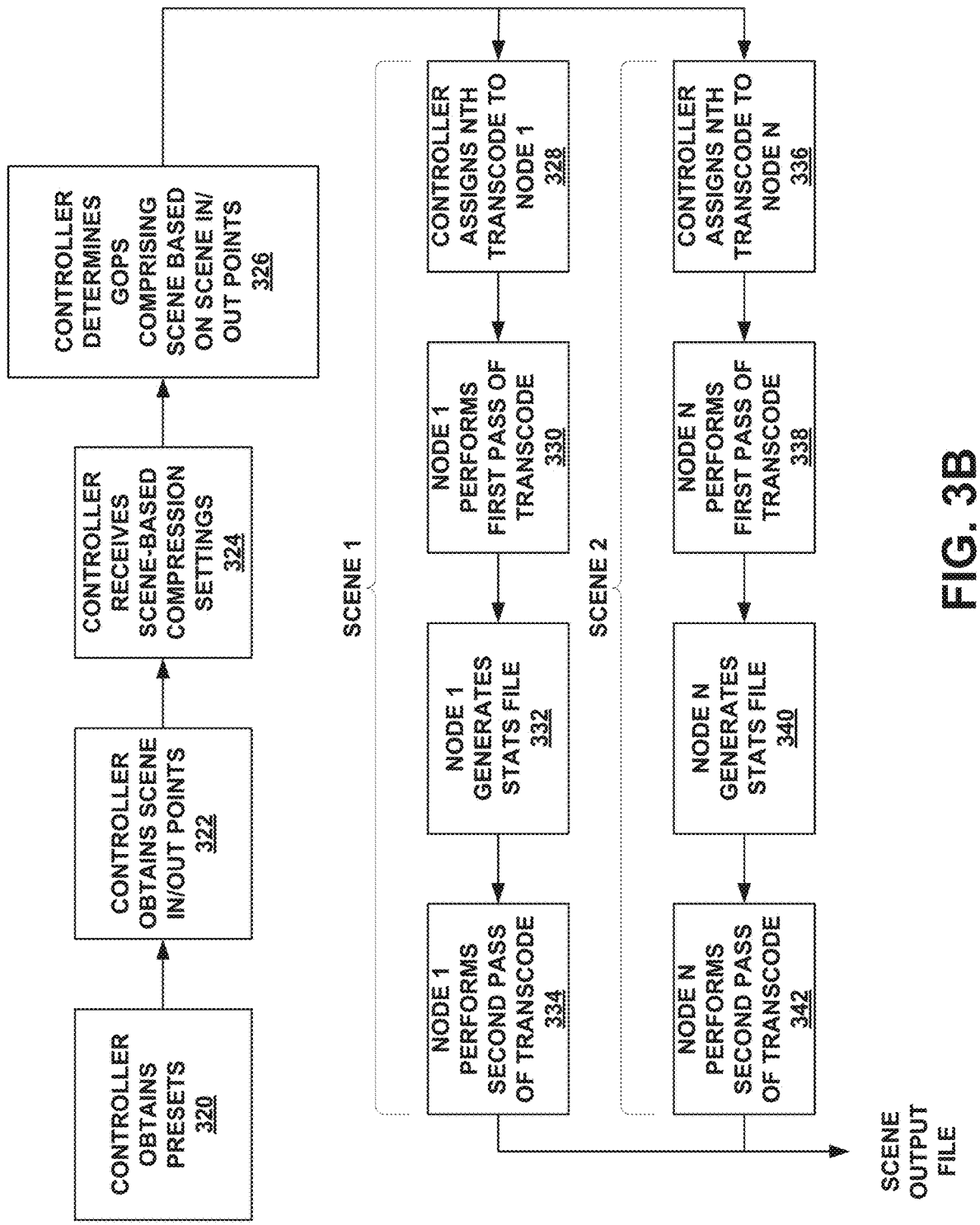
FIG. 3B is a flow chart illustrating example operations that can be performed for scene-based transcoding in accordance with one embodiment.

FIG. 3B illustrates example operations that can be performed to transcode media content utilizing scene-based compression profiles in accordance with one embodiment, for example, by the transcoding system of FIG. 3A. At operation 320, controller 302 obtains a set of presets for the key frame aligned output files. The presets can refer to a collection of settings, such as compressed video bitrate and output frame size, that define how the transcoder, such as a transcode node 304, 306, 308, processes the source file to produce the corresponding output files. In some implementations, the presets may be obtained from a system user, from a storage location, or by being generated by the controller 302. By way of example presets can designate output files having different bitrates being paired with differing advanced settings. In various implementations, greater or fewer numbers of presets may be employed, along with various combinations of advanced settings and bitrates.

At operation 322, controller 302 obtains scene in/out points. As previously discussed, scene in/out points can be automatically determined by controller 302. Alternatively, a user may specify desired scene in/out points corresponding to identified scenes to which scene-based compression settings (received by controller 302 at operation 324) may be applied. In still other embodiments, the scene in/out points can be obtained from a manifest or accessed from a database storing scene metadata.

At operation 326, controller 302 determines the GOPs comprising a scene based on the scene in/out points. In this way, controller 302 can transmit the appropriate frames to the one or more of transcode nodes 304, 306, and 308 for transcoding. It should be noted that although some embodiments define scenes in terms of GOPs, timecodes alone can be used to specify scenes, where controller 302 may send timecodes rather than GOP-based information to one or more transcode nodes 304, 306, and 308 to be used for transcoding.

At operation 328, controller 302 identifies an available transcode node (e.g., Node 1) and assigns the node to transcode the source file to produce a first scene output file. In some implementations, controller 302 transmits a JavaScript Object Notation (JSON) based instruction over the network to Node 1. The JSON based instruction may contain an instruction to transcode the preset according to the preset frame size and bitrate. The instruction may also include information regarding where the source file is stored, where to upload scene output files, what compression settings (profiles) to use, etc.

Node 1 may receive the message from controller 302, parse the message, and encode the file specified in the instruction using the preset parameters and compression settings. In particular, at operation 330, Node 1 performs a first pass of a transcoding step to, at operation 332, generate a statistics file (stats file). A stats file may be output by transcoders, such as H.264-compliant coders like the x264 transcoder. Stats files detail various parameters that were used when transcoding a file and may be used by transcoders in future encoding passes. For example, a two-pass transcoding procedure may comprise an analysis pass and an encoding pass. In the analysis pass, a source file representative of a media content is analyzed by the transcoder to produce a preliminary stats file. The preliminary stats file is then used in the encoding pass to produce a transcoded file. During the encoding pass, the stats file is also updated according to various decisions made by the transcoder during the second encoding pass. Transcoding procedures may also implement multiple encoding passes. In each subsequent encoding pass, the stats file from the previous encoding pass is used as an input and updated according to various decisions made during the subsequent encoding pass. The stats file comprises a list of options that are used to set various transcoding parameters. The stats file further comprises parameters that are used to encode each frame of the video. The parameters may include input and output frame number, frame type, bit allocations for the frame, motion vectors, and residuals, and other transcoding parameters. It should be understood that the scene-based compression settings and/or the scene in/out points or metadata used for controlling the transcoding may be included in the stats file.

In some embodiments, the stats file may be used in a predictive manner to determine what compression settings should/may be used for a particular scene(s). For example, in one embodiment, rather than a user specifying desired compression settings for a particular, scene characteristics data from a scene to be transcoded can be compared with information included in stats files. If there is some correlation between the scene characteristics data and information included in one or more stats files, the scene-based compression settings can be used for the scene to be transcoded.

When performing multi-pass encoding, at operation 334, Node 1 performs the second pass of the transcoding procedure using the stats file generated during the first pass and in accordance with the compression settings specified for that scene.

It should be noted that various embodiments can be applied to a single pass encoding context as well by using identified time-code scenes for chunks of compression. Application to the single pass encoding context can save overall time in compression, which can be especially useful for live stream or live broadcast media content. For example, when the media content to be compressed is a live stream or live broadcast media content, such as a live football game, the live stream or live broadcast action scenes (play action scenes) can be compressed in accordance with a single-pass compression scheme, such as a single-pass, constant bit-rate (CBR) compression scheme. The bit rate may be set to a relatively high bit rate to accommodate the fast-moving action. Commentary scenes between the play action scenes can be identified and compressed using a single-pass, CBR compression scheme as well, although the bit rate may be lower than that used for compressing the play action scenes. Further still, pre-produced commercials presented between the play action and/or commentary scenes can be identified and compressed using yet another single-pass CBR compression scheme having an even lower bit rate. The use of single-pass, CBR compression schemes with a lower bit rate can be used because commentary and/or commercial scenes may not warrant the higher bit rates, although this may be adjusted if need be.

At operation 336, controller 302 may simultaneously identify further available nodes, and transmit transcode instructions to the available transcode nodes 306, 308, etc. Similar to the first instruction, the instructions may be transmitted as JSON formatted messages to the network-connected transcode nodes. The instructions may include a location of the source file and locations to store transcoded output files.

After a transcode node finishes performing a transcode operation, it can upload, in this case, the scene output file, and inform the controller 302 it has completed its transcoding operation. The location for where the scene output file should be stored may be indicated in the original transcode instruction message received by a transcode node from controller 302. In this way, the controller 302 may stitch the transcoded scenes back together to create a transcoded output file representative of the media content in the source file.

It should be noted that some embodiments described herein refer to transcoding media content prior to delivery to an entity or device that will present the transcoded media content. For example, a content distributor may transcode a media content to create multiple versions of a movie that can be used for multiple avenues of distribution. The transcoded media contents may be stored until requested/needed for distribution.

In some embodiments, however, transcoding can be performed in near-real time, for example, when transcoding live media content. Live media content may be, e.g., a live sporting event, that is being streamed or broadcast to viewers. Referring back to FIG. 2, a camera 214 may be taking live video of an event. The resulting video can be a source file 214A that is transmitted to a media server 206 to be transcoded.

Referring to FIG. 3B, operations 322, 324, and 326 can occur periodically as the live media content is being streamed, broadcast, or otherwise distributed. In particular, controller 302 may intercept the live media content, determine scene in/out points, assign appropriate compression profile or settings, and forward GOPS comprising the scene to a transcode node for transcoding. In doing so, transcoded live media content may be slightly delayed in its transmission. The detection of scene in/out points may be dependent, in some embodiments, upon distinguishing between commercials and the live media content itself. For example, a high bitrate may be specified when transcoding the live media content, and a lower bitrate may be specified when transcoding commercials. Live broadcasts or media streams generally include hidden signals indicating when a commercial starts and when the live media content resumes. These can be used as scene in/out points.

Figure 4:
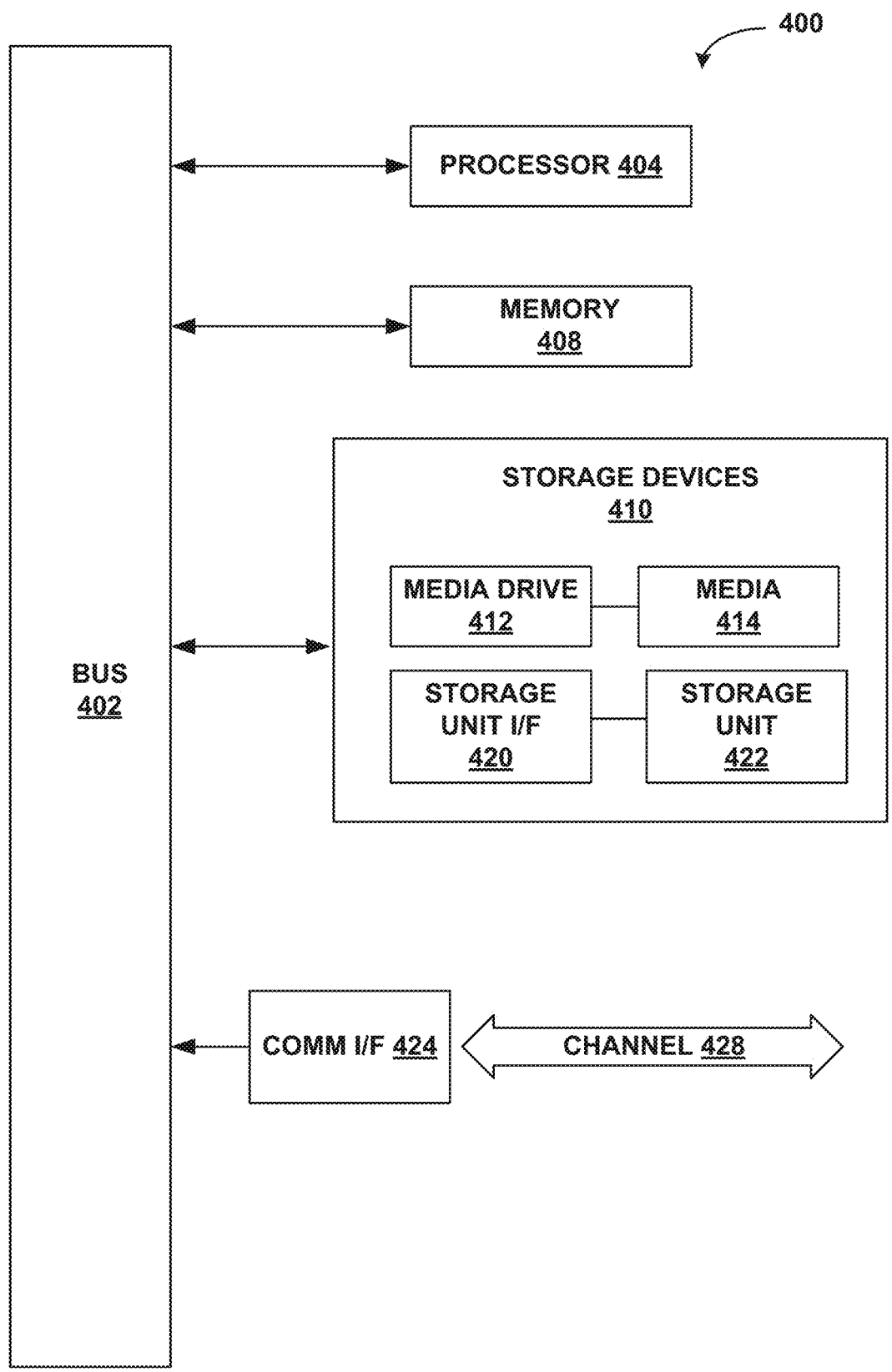
FIG. 4 is an example computing component that may be used to implement various features of embodiments described in the present disclosure.

FIG. 4 illustrates an example computing component that may be used to implement various features of the system and methods disclosed herein, for example, computer 204, transcoder 202, remote datastore 208, controller 302, transcode nodes 304-408, storage 310, and/or any of their respective component parts.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Where components of the application are implemented in whole or in part using software, in one embodiment, these software elements can be implemented to operate with a computing or processing component capable of carrying out the functionality described with respect thereto. One such example computing component is shown in FIG. 4. Various embodiments are described in terms of this example-computing component 400. After reading this description, it will become apparent to a person skilled in the relevant art how to implement the application using other computing components or architectures.

Referring now to FIG. 4, computing component 400 may represent, for example, computing or processing capabilities found within a self-adjusting display, desktop, laptop, notebook, and tablet computers; hand-held computing devices (tablets, PDA's, smart phones, cell phones, palmtops, etc.); workstations or other devices with displays; servers; or any other type of special-purpose or general-purpose computing devices as may be desirable or appropriate for a given application or environment. Computing component 400 might also represent computing capabilities embedded within or otherwise available to a given device. For example, a computing component might be found in other electronic devices such as, for example navigation systems, portable computing devices, and other electronic devices that might include some form of processing capability.

Computing component 400 might include, for example, one or more processors, controllers, control components, or other processing devices, such as a processor 404. Processor 404 might be implemented using a general-purpose or special-purpose processing engine such as, for example, a microprocessor, controller, or other control logic. In the illustrated example, processor 404 is connected to a bus 402, although any communication medium can be used to facilitate interaction with other components of computing component 400 or to communicate externally.

Computing component 400 might also include one or more memory components, simply referred to herein as main memory 408. For example, preferably random access memory (RAM) or other dynamic memory, might be used for storing information and instructions to be executed by processor 404. Main memory 408 might also be used for storing temporary variables or other intermediate information during execution of instructions to be executed by processor 404. Computing component 400 might likewise include a read only memory ("ROM") or other static storage device coupled to bus 402 for storing static information and instructions for processor 404.

The computing component 400 might also include one or more various forms of information storage mechanism 410, which might include, for example, a media drive 412 and a storage unit interface 420. The media drive 412 might include a drive or other mechanism to support fixed or removable storage media 414. For example, a hard disk drive, a solid state drive, a magnetic tape drive, an optical disk drive, a compact disc (CD) or digital video disc (DVD) drive (R or RW), or other removable or fixed media drive might be provided. Accordingly, storage media 414 might include, for example, a hard disk, an integrated circuit assembly, magnetic tape, cartridge, optical disk, a CD or DVD, or other fixed or removable medium that is read by, written to or accessed by media drive 412. As these examples illustrate, the storage media 414 can include a computer usable storage medium having stored therein computer software or data.

In alternative embodiments, information storage mechanism 410 might include other similar instrumentalities for allowing computer programs or other instructions or data to be loaded into computing component 400. Such instrumentalities might include, for example, a fixed or removable storage unit 422 and an interface 420. Examples of such storage units 422 and interfaces 420 can include a program cartridge and cartridge interface, a removable memory (for example, a flash memory or other removable memory component) and memory slot, a PCMCIA slot and card, and other fixed or removable storage units 422 and interfaces 420 that allow software and data to be transferred from the storage unit 422 to computing component 400.

Computing component 400 might also include a communications interface 424. Communications interface 424 might be used to allow software and data to be transferred between computing component 400 and external devices. Examples of communications interface 424 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 424 might typically be carried on signals, which can be electronic, electromagnetic (which includes optical) or other signals capable of being exchanged by a given communications interface 424. These signals might be provided to communications interface 424 via a channel 428. This channel 428 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 408, storage unit 420, media 414, and channel 428. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 400 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the elements or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method, comprising:
identifying and categorizing scenes of a media content;
assigning a compression profile to each of the scenes, wherein the compression profile is automatically selected based upon one or more characteristics of at least one of the scenes;
transcoding each of the scenes of the media content from a first format to at least one other format in accordance with the assigned compression profiles, each of the assigned compression profiles comprising a video bitrate and output frame size;
generating an output file from the transcoded media content in the at least one other format, the output file comprising transcoded versions of each of the scenes commensurate with the assigned compression profiles;
wherein the one or more characteristics of the at least one of the scenes comprises thematic characteristics.

2. The computer-implemented method of claim 1, wherein identifying and categorizing the scenes of the media content is performed manually or automatically based upon one or more common elements between frames or a group of pictures comprising a scene.

3. The computer-implemented method of claim 1, wherein transcoding each of the scenes of the media content comprises multi-pass transcoding, wherein a first pass of the multi-pass transcoding comprises generating a statistics file including information regarding compression settings comprising the compression profile assigned to each of the scenes.

4. The computer-implemented method of claim 3, wherein the statistics file further includes scene boundary information.

5. The computer-implemented method of claim 1, wherein transcoding each of the scenes of the media content comprises single-pass transcoding, and wherein a selected compression profile performs compression based on identified time-code scenes.

6. The computer-implemented method of claim 1, further comprising defining scene boundaries for identifying the scenes upon transcoding each of the scenes of the media content.

7. The computer-implemented method of claim 6, wherein defining the scene boundaries comprises specifying scene in and out points.

8. The computer-implemented method of claim 1, wherein the media content is presented as at least one of a live stream or a live broadcast.

9. The computer-implemented method of claim 8, further comprising analyzing metadata associated with the at least one of the live stream or the live broadcast to identify at least one of a start point or an end point associated with a commercial presented during the at least one of the live stream or the live broadcast.

10. The computer-implemented method of claim 8, further comprising analyzing metadata associated with the at least one of the live stream or the live broadcast to identify at least one of a start point or an end point associated with media content presented as the at least one of the live stream or the live broadcast.

11. The computer-implemented method of claim 1, wherein transcoding each of the scenes of the media content comprises transcoding a source file representing the media content.

12. A computer-implemented method, comprising:
receiving scene start and end points associated with each of a plurality of scenes comprising a movie;
receiving one or more sets of compression settings applicable to each of the plurality of scenes, each of the one or more sets of compression settings having been automatically selected based upon thematic characteristics of each of the plurality of scenes, and each of the one or more sets of compression settings comprising a video bitrate and output frame size optimized for the thematic characteristics of each of the plurality of scenes;
transcoding each of the plurality of scenes in accordance with a corresponding set of compression settings; and
outputting transcoded versions of each of the plurality of scenes.

13. The computer-implemented method of claim 12, wherein the transcoding of each of the plurality of scenes comprises performing an analysis pass and an encoding pass.

14. The computer-implemented method of claim 13, wherein the encoding pass comprises compressing each of the plurality of scenes in accordance with the corresponding set of compression settings.

15. The computer-implemented method of claim 12, wherein the transcoding of each of the plurality of scenes comprises assigning the transcoding of each of the plurality of scenes to separate transcode nodes, and performing the transcoding of each of the plurality of scenes at the separate transcode nodes in parallel.

16. The computer-implemented method of claim 15, further comprising storing the one or more sets of compressions settings as part of at least one of each of the transcoded versions of each of the plurality of scenes, in a transcoded version of the movie comprising each of the transcoded versions of each of the plurality of scenes stitched together, a data file associated with the transcoded version of the movie, or a statistics file used in the transcoding of each of the plurality of scenes.

17. A system, comprising:
a controller configured to:
obtain sets of groups of pictures, each set of the groups of pictures representing one of a plurality of scenes of a media content;
assign one or more compression profiles including one or more compression techniques to each of the plurality of scenes, each of the one or more compression techniques having been automatically selected based upon thematic characteristics of each of the plurality of scenes to produce a video bitrate and output frame size optimized for the thematic characteristics of each of the plurality of scenes; and
at least one transcoder configured to:
transcode each of the plurality of scenes using a corresponding compression profile; and
output a transcoded version of the media content comprising the plurality of transcoded scenes.

18. The system of claim 17, further comprising a storage configured to receive a statistics file generated by the at least one transcoder, wherein the storage includes information indicative of at least the one or more compression techniques applicable to each of the plurality of scenes.

19. The system of claim 17, wherein the sets of groups of pictures are identified by start and end points.

20. The system of claim 17, wherein the at least one transcoder is configured to operate prior to distribution of the transcoded version of the media content or in near-real time when receiving live media content.

* * * * *